United States Patent [19]

Foggini

[11] Patent Number: 4,521,046

[45] Date of Patent: Jun. 4, 1985

[54] CELL STRUCTURE SUN VISOR FOR AUTOMOBILE VEHICLES INCLUDING RETENTION AND SNAP-ACTION POSITIONING MEANS

[75] Inventor: Giovanni Foggini, Turin, Italy

[73] Assignee: Lear S.n.c. di Foggini & C., Orbassano, Italy

[21] Appl. No.: 461,815

[22] Filed: Jan. 28, 1983

[30] Foreign Application Priority Data

Feb. 9, 1982 [IT] Italy ............................. 67146 A/82

[51] Int. Cl.³ ............................................... B60J 3/02
[52] U.S. Cl. ................................................... 296/97 K
[58] Field of Search ............. 296/97 K, 97 H; 403/71, 403/84, 97, 359

[56] References Cited

U.S. PATENT DOCUMENTS

| | | | |
|---|---|---|---|
| 2,299,775 | 10/1942 | Westrope | 296/97 K |
| 2,458,677 | 1/1949 | Brundage | 296/97 K |
| 3,032,371 | 5/1962 | Berridge | 296/97 K |
| 3,128,121 | 4/1964 | Greig | 296/97 H |
| 3,999,871 | 12/1976 | Palmer et al. | 296/97 K |

FOREIGN PATENT DOCUMENTS 2032368  5/1980  United Kingdom ............ 296/97 H

*Primary Examiner*—Robert R. Song
*Attorney, Agent, or Firm*—Guido Modiano; Albert Josif

[57] ABSTRACT

The sun visor comprises a load-bearing structure including a shaped element die-cut from a sheet of a cell polymeric material having straight parallel channel-like cells, and a suspension and securing rod engaged in one of the cells, the cell engaging with the rod, or alternatively an insert intervening between the rod and cell having at least one raised rib formed thereon which is adapted to engage with the rod surface for frictional retention, and at least one longitudinal groove in the rod adapted for releasably.

4 Claims, 2 Drawing Figures

CELL STRUCTURE SUN VISOR FOR AUTOMOBILE VEHICLES INCLUDING RETENTION AND SNAP-ACTION POSITIONING MEANS

BACKGROUND OF THE INVENTION

This invention relates to a sun visor for automobile vehicles, of the type having a cell structure.

Disclosed in prior UK Patent Application No. 2 032 368 by this same Applicant is a sun visor, or glare shield, comprising a load-bearing structure including a shaped element which is die-cut from a sheet of a cell polymeric material obtained by continuous extrusion; the cells being straight, parallel, and of channel-like configuration.

According to the patent application cited above, also provided is a means for suspending and securing the visor which comprises a rod accommodated directly in one of the channel-like cells of the load-bearing structure, thereby a firm registration is formed by friction between the rod and inside surface of the cell channel.

SUMMARY OF THE INVENTION

The task of this invention is to provide an improvement directed to enable, in a simple and reliable manner, to maintain said distinctive features of friction unaltered even after a prolonged period of use and in high ambient temperature conditions.

Within that task, it is an object of the invention to have at least a release retention position, said position preferably coinciding with the home position whereat the visor is raised against the roof panel.

According to one aspect of the invention, the above task and object, as well as yet other objects which will become more apparent hereinafter are achieved by a sun visor for automobile vehicles of the type having a cell structure comprising a sun visor for automobile vehicles of the type having a cell structure comprising:

a wire rod having a first portion bent to a right angle with an end thereof attached to a support for engagement with an automobile body roof panel and a second portion engaging with one cell of the cell structure at least a longitudinal groove formed along at least one portion of said wire rod second portion an insert of a high strength polymeric material interposed between said cell and said wire rod second portion and surrounding said second portion at least one longitudinal projecting ribs formed internally along said insert engaging said longitudinal groove said longitudinal groove being adapted to receive said longitudinal rib for elastic release engagement positioning said sun visor said insert having a length equal at least one half the length of said wire rod.

BRIEF DESCRIPTION OF THE DRAWINGS

Further features and advantages will be apparent from the following detailed description, with reference to the accompanying drawings, given herein by way of example and not of limitation, and where.

DESCRIPTION OF THE PREFERRED EMBODIMENT

Figure 1:
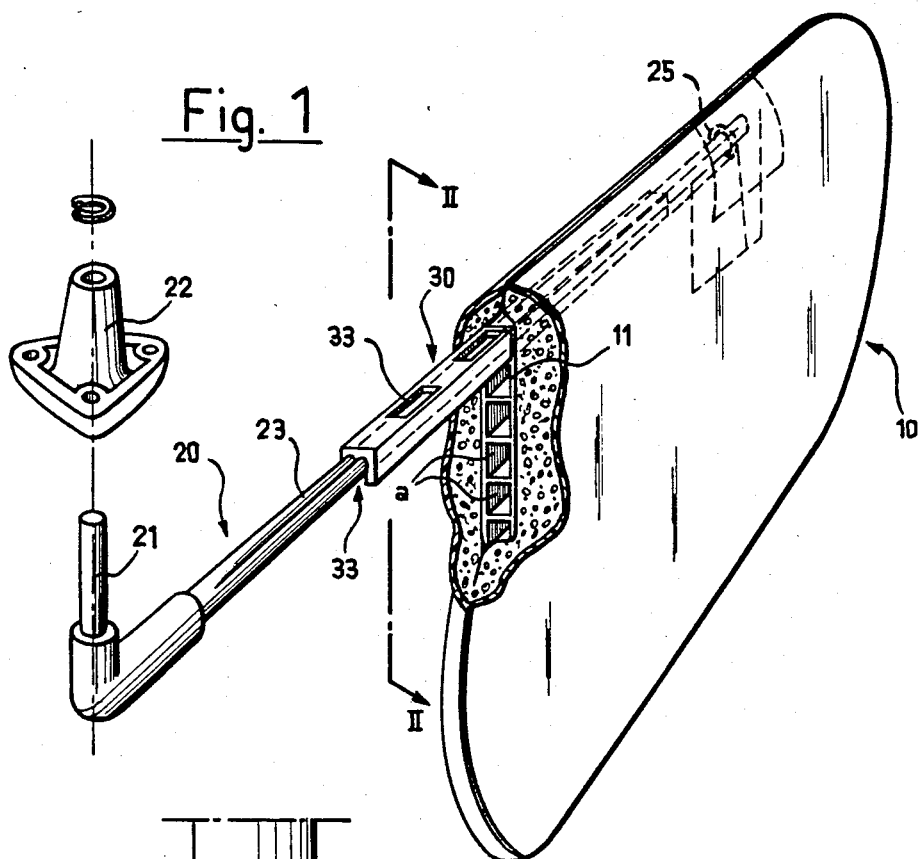
FIG. 1 is an exploded partly sectional view of a sun visor provided with release retention and/or locating means, according to this invention.
Figure 2:
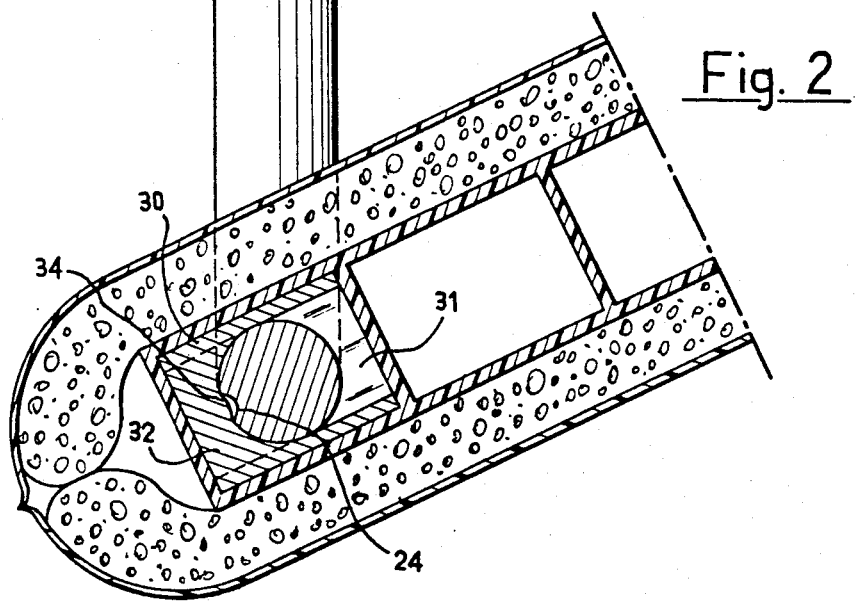
FIG. 2 is an enlarged scale cross-sectional view taken along the line II—II of FIG. 1.

In the drawings, indicated generally at 10 is a sun visor according to the invention, which comprises a load-bearing structure 11 including a shaped element die-cut from a sheet of a cell polymeric material having rectilinear, parallel, and channel-like cells a. The sun visor further comprises a wire rod 20 having one end 21 bent to a right angle and adapted to cooperate with a support or holder 22 so as to define an adjustment hinge. The body 23 of the rod 20 engages in one of the cells a of the structure 11, with the interposition of an insert 30 for tilting and trip locating the sun visor 10; said insert being either continuous or divided in several segments. The insert 30 is also made of a polymeric material, but with different mechanical and chemical-physical characteristics, preferably superior to those of the material comprising the structure 11. In particular, the material of the insert 30 is selected from a group which comprises acetal resin (polyoxymethylene) and polycarbonate (ester of carbonic acid-dioxyphenylpropane).

The lengthwise of the insert 30 is selected to be equal to at least one half the lengthwise of the rod body 23, but preferably, said body and insert will have the same axial dimension. As clearly shown in the Figures, the insert 30 has the areas 31–32 diametrically opposed comprising alternatively in an axial direction voids 33 to increase the elasticity of said insert and useful in molding. The areas 31 are located below the rod relatively to the visor position shown in FIG. 1 and are preferably configured as a smooth cylindrical half-cradle. The upper areas 32 are instead each formed with a substantially rounded longitudinal rib 34, the ribs being aligned along a single generatrix and broken at the molding voids 33. A mating groove or flute 24 is formed in the rod body 23 which is adapted for engagement by said ribs.

The insert 30, which is molded separately has, a prismatic external profile coinciding with that of the cell a and is inserted into said cell to a slight force fit. Next, after aligning the groove 24 with the ribs 34, the rod 20 is introduced into the insert and locked at an axial position by means of a ring 25 for groove-less shafts which is positioned at the end of the rod made accessible by a window 15 formed through the structure 11. The ring 25 may be significantly displaced from the inside end to allow for a corresponding sliding movement of the visor relatively to the rod, serving for positioning the visor to best screen off the sun rays.

The mutual engagement of the ribs 34 and groove 24 holds the visor steadily at a selected corresponding angular position which coincides with the home position whereat the visor is laid adjacent the roof panel. As the visor is acted upon to tilt it thanks to the elasticity of the insert materials surrounding the rod 20, the ribs are disengaged from the groove. With rotation, the ribs—by being forced against the cylindrical surface of the rod—provide the frictional couple required to oppose tilting. The home position is found with a trip movement as, thanks to the rounded configuration of the ribs 34 and groove 24, these approach a proximity position.

It will be appreciated that by providing the rod body 23 with additional angularly spaced grooves, it becomes possible to achieve further corresponding positions of steady retention of the visor, which the latter occupies when it turns around the rod.

Of course, within the same principle of the invention, the embodiment details and manners of practicing the invention may broadly varied with respect to what has been described and illustrated by way of a non-restrictive example, without departing from the invention scope.

Thus, as an example, where the material of the structure 11 is sufficiently strong, the insert 30 may be omitted, and the rib 34 be formed directly by extrusion on the cell a intended to accommodate the rod 20. Similarly, the arrangement of the ribs and groove in mutual cooperation may be reversed by providing the groove(s) 24 on the insert or cell, and the raised rib 34 on the rod; this arrangement being quite equivalent as regards the results to be achieved.

I claim:

1. A sun visor for automobile vehicles of the type having a cell structure comprising:
    a wire rod having a first portion bent to a right angle with an end thereof attached to a support for engagement with an automobile body roof panel and a second portion engaging with one cell of the cell structure
    at least a longitudinal groove formed along at least one portion of said wire rod second portion
    an insert of a high strength polymeric material interposed between said cell and said wire rod second portion and surrounding said second portion
    at least one longitudinal projecting rib formed internally along said insert engaging said longitudinal groove
    said longitudinal groove being adapted to receive said longitudinal rib for elastic release engagement positioning said sun visor
    said insert having a length equal at least one half the length of said wire rod.

2. A sun visor as claimed in claim 1, wherein said insert having diametrically opposed areas formed one with a smooth semicylindrical cradle configuration and the other with a projecting rib surface cradle configuration.

3. A sun visor as claimed in claim 2, wherein said diametrically opposed areas have alternatively in an axial direction voids to increase the elasticity of said insert.

4. A sun visor as claimed in claim 1, wherein said insert is made of a polymeric material selected from the group comprising acetal resin and polycarbonate to maintain a high resistance and a distinctive features of friction even after a prolonged period of use in high ambient temperature conditions.

* * * * *